United States Patent Office 3,239,437
Patented Mar. 8, 1966

3,239,437
METHODS OF DEPOSITING MAGNETIC
ALLOY FILMS
James Henry Stephen, Abingdon, England, assignor to
United Kingdom Atomic Energy Authority, London,
England
No Drawing. Filed July 24, 1961, Ser. No. 125,987
Claims priority, application Great Britain, July 28, 1960,
26,379/60
4 Claims. (Cl. 204—43)

This invention relates to methods of electrodepositing magnetic alloy films, especially nickel/iron films of the Permalloy type.

In the specification of copending application Serial No. 844,205, filed October 5, 1959, now Patent No. 3,027,309, a process is described for electrodepositing approximately 80/20 nickel/iron films having substantially rectangular hysteresis loops from an aqueous solution of nickel and ferrous sulphamates, such films having application in magnetic switching and memory devices.

The aforementioned specification describes, by way of example, a process for depositing an 80/20 nickel/iron film 16,000 A. thick. Although satisfactory for producing thin films of this order of thickness, it has been found that for very thin films (less than 2000 A.), the sulphamate process gives films which have rectangular hysteresis loops but which have a high coercive force of about 10 oersteds. This value of coercive force, which is between 3 and 10 times that obtained with evaporated nickel/iron films of the same thickness, is undesirable as it increases the magnetising force required to switch the film from one saturation state to the other. One possible cause of the high coercive force of very thin sulphamate-deposited film may be the strong epitaxial effects of the copper substrate. It is known that the effect of the substrate on the growth of electrodeposited nickel only ceases when the film reaches 1000 A., after which thickness the solution conditions influence its further growth.

There are two possible methods of reducing the substrate effect; either to find a substrate which has little effect, or to use an electrolyte which has a greater control over the growth of the film. Taking into account convenience of manufacture, no really satisfactory substitute for copper has been found as a substrate. The present invention relates to a process using a different electrolyte, by which it is possible to produce films less than 2000 A. thick but having coercive forces of between 3 and 4 oersteds. The process also enables films to be deposited more rapidly, and under less critical conditions, than does the sulphamate process.

According to one aspect of the present invention a method of preparing an aqueous solution suitable for use as an electrolyte in electrodepositing magnetic alloy films and containing the alloy constituents as complex citrate anions, comprises using reagents which leave only citrate anions and ammonium cations in the solution.

According to another aspect of the present invention, a method of preparing an aqueous solution suitable for use as an electrolytic in electrodepositing magnetic alloy films and containing the alloy constituents as complex citrate anions, comprises using reagents which introduce into the solution no alkali metal cations and no halogen, sulphate and sulphamate anions.

According to a further aspect of the present invention a method of preparing an aqueous solution suitable for use as an electrolyte in electrodepositing magnetic alloy films and containing the alloy constituents as complex citrate anions, comprises reacting citric acid and ammonium citrate with forms of said constituents which leave citrate anions as the only anions in the aqueous solution.

Also according to the present invention, a method of preparing an aqueous solution, suitable for use as an electrolyte in electrodepositing nickel/iron alloy magnetic films and containing nickel and iron as complex citrate anions, comprises reacting citric acid and ammonia citrate with nickel carbonate and with metallic iron. Preferably a nickel citrate complex solution and an iron citrate complex solution are prepared separately and thereafter mixed.

A method of electrodepositing magnetic alloy films according to the present invention comprises using as the electrolyte a solution of the alloy constituents prepared as aforesaid.

A method of electrodepositing nickel/iron alloy magnetic films comprises using as the electrolyte a solution of nickel and iron prepared as aforesaid. Preferably the pH of the electrolyte during deposition is maintained between 9 and 10, the cathode current density is adjusted to give a deposition potential in the range 1400–1450 mv., and the electrolyte temperature is in the range 18–22° C. The film preferably deposited on a copper or nickel/copper alloy substrate.

For depositing nickel/iron films over 7500 A. thick, the deposition is preferably performed in stages, not more than 7500 A. being deposited during each stage and the deposition being stopped for a period between stages to allow hydrogen trapped in the film to escape.

According to the present invention a solution suitable for use as an electrolyte in depositing magnetic alloy films consists essentially of an aqueous solution of ammonium citrate containing the alloy constituents as complex citrate anions, said solution containing no alkali metal cations and no halogen, sulphate and sulphamate anions. Said constituents may be nickel and iron.

A magnetic device according to the present invention comprises a former having a magnetic alloy film deposited thereon by a method as aforesaid.

It is known to deposit nickel and nickel/iron alloy films from ammonium citrate solutions of nickel and iron citrate complexes, but it has been found that nickel/iron films deposited from such electrolytes prepared by published methods are no better than those deposited from sulphamate solutions. In the known methods the nickel and iron ions are introduced into the citrate solution as sulphates or chlorides of nickel and iron (the halogen salts, sulphates and sulphamates of these metals being forms which will readily dissolve in a citrate solution to give possible electrolytes). The use of sulphates or chloride means, however, that when the metallic ions complex with ammonium citrate, sulphate or chloride anions remain in the solution and can take part in the reaction at the cathode. Similarly, in some known methods, alkali metal citrates such as sodium and potassium citrates have been used as the complexing reagent, with the result that alkali metal cations remain in the solution.

It has been found that the presence of halogen, sulphate and (to a lesser extent) sulphamate anions, and the presence of alkali metal cations, is detrimental in that they produce stress, which results in brittle films and deterioration of the magnetic properties of the film (mainly increased coercive force).

In the present method the metallic ions are introduced in forms which leave only citrate anions in the solution, suitable reagents being nickel carbonate and hydrogen-reduced iron dust. Nickel carbonate is available of high purity (low in cobalt), being assigned the approximate formula $NiCO_3.2Ni(OH)_2.4H_2O$. The citrate complexing reagent used is ammonium citrate. The only "metallic" cation present in the solution is $NH_4^+$, which is necessary for the control and functioning of the electrolyte.

By way of example, details of the preparation of an electrolyte for depositing an 82/18 nickel/iron film will now be described:

The nickel citrate complex and iron citrate complex solutions are prepared separately as follows:
For the nickel solution:

Nickel carbonate ($NiCO_3.2Ni(OH)_2.4H_2O$)
gm__ [1] 36
Ammonium citrate _____gm__ 60
Citric acid _____gm__ 50
Distilled water _____ml__ 250
For the iron solution:
Iron dust _____gm__ 3.56
Ammonium citrate _____gm__ 15.5
Citric acid _____gm__ 13.3
Distilled water _____ml__ 200

[1] Containing 16.2 gm. of nickel.

For each solution the reaction is performed in a glass flask with a refluxing column. The chemicals are first mixed and the water added, and the flask is then heated gently. The nickel carbonate dissolves very rapidly (in less than 15 minutes) giving off $CO_2$, but the iron is slower and takes over an hour, liberating hydrogen. When the solutions have cooled to room temperature the pH of each is adjusted to pH 9.25 by adding ammonium hydroxide. The two solutions are then mixed, boiled for one hour, and allowed to stand for 24 hours, when the pH is again adjusted to pH 9.25 if necessary. The electrolyte is now ready for use.

Deposition of nickel/iron from the above solution requires a modified technique as compared with the sulphamate process, largely because of the roughly tenfold increase in cathode current density necessitated by the higher deposition potential of about 1400 mv. (measured with respect to a saturated calomel electrode). Satisfactory films have been produced with cathode current densities in the range 50–100 ma./sq. cm., the deposition efficiency being about 50%.

By way of example the deposition of a 2000 A. film on to a copper rod 4 cm. long and 0.1 cm. in diameter (area 1.26 sq. cm.) will now be described.

The surface of the copper rod is prepared in the same manner as described in the aforementioned specification. The electrolytic cell is a cylindrical glass container 6.5 cm. in diameter and 5 cm. high. The cylindrical anode, of pure nickel, fits closely the inside surface of the container. The polished copper rod forming the cathode is suspended in the centre of the cell. A C-shaped permanent magnet provides an axial aligning field of approximately 500 gauss. The cell is located between the poles of the magnet, a hole in the upper pole allowing access to the cathode at the centre of the cell.

The electrolyte, prepared as already described, is used at room temperature 18–22° C., and at pH 9.25. By contrast with the sulphamate deposition process, it is unnecessary to monitor the deposition potential between the cathode and the solution, since the deposition conditions are less critical with the present electrolyte. It is also unnecessary to rotate the cathode or to provide gas-bubble agitation of the electrolyte.

The current for the cell is provided by a constant-current source which is set to the required current before deposition commences and need not be adjusted during the deposition. In the present example the current is set to 72 ma., corresponding to a current density of 60 ma./sq. cm. of cathode area. An electronic coulombmeter measures the charge passing through the cell.

To deposit the 2000 A. film, the current is switched on for 20 seconds to pass a charge of 1.44 coulombs. The rod is then removed and washed in distilled water and isopropyl or ethyl alcohol. The charge passed depends on the thickness required in the usual way.

Films deposited as in the above example have a rectangular hysteresis loop with high remanence, and have a coercive force of between 3 and 4 oersteds. The magnetising force required to saturate the film in the difficult direction, i.e., normal to the axis of the rod, is between 6 and 9 oersteds.

As in the sulphamate process, other methods of applying an aligning field can be used.

Satisfactory films have been deposited on copper rods from 0.0125 cm. to 0.23 cm. in diameter under the following conditions.

(a) For 82/18 nickel/iron films, a mass ratio of nickel to iron in the solution of 82/18 has been used, as in the above-described example (viz. 16.2/3.56). It is believed that the present electrolyte complexes the nickel and iron in such a way that they become electrochemically similar and are no longer separated by approximately 200 mv. on the electrochemical scale. The consequence of this "leveling" in electrochemical activity is that the desired alloy ratio can be obtained by using an electrolyte containing that ratio of nickel to iron. Magnetic measurements indicate that the film obtained with an 82/18 ratio solution is, in fact, 82/18 nickel/iron alloy.

(b) A total metal concentration of 24 gm. per litre has been found satisfactory. Twice and one-third of this concentration have been used without harm or advantage, but if low concentrations are used the solution becomes more rapidly depleted with use.

(c) The electrolyte has been used at room temperature (18–22° C.) with the pH between 9 and 10. There appears to be a buffering point at pH 8.9 when complexing is occurring, and it is necessary to work above this value for satisfactory results. Moreover, if the pH is more acid than 9, hydrogen evolution predominates and the film is brittle. A pH more alkaline than 10 also causes a brittle film and produces a gel in the electrolyte.

(d) Deposition current densities between 40 and 120 ma./sq. cm. have been used, but the range 50–100 ma./sq. cm. is preferred, corresponding to a deposition potential range of 1400–1450 mv. Below 50 ma./sq. cm. the hysteresis loop starts to become less rectangular. Above 100 ma./sq. cm. more hydrogen is liberated as the rate of metal deposition does not increase; the hysteresis loop shows an increased coercivity and becomes less rectangular.

Copper has proved a satisfactory substrate. It is not necessary to "strike" the cathode surface before depositing the major part of the film.

In some electroplating baths, chloride ion is added to facilitate anode solution. In the present type of deposition, anode solution is not required and may indeed be prevented altogether by using a platinum anode. The amount of metal deposited in producing even a large number of films is small compared with the quantity in the electrolyte. The use of a nickel/iron alloy anode is not satisfactory as the iron dissolves more readily than the nickel. It is preferable to use a fresh solution after a certain number, say 500, of depositions.

No special measures are necessary to keep the electrolyte concentration constant at the cathode surface, largely because the deposition is so rapid that no flow of liquid due to concentration gradients is set up. Moreover, in depositing axially aligned films the larger currents used, as compared with the sulphamate process, interact with the D.C. magnetic aligning field to cause rotation of the electrolyte, the effect being equivalent to rotating the rod.

In addition to enabling very thin films to be produced having the desired properties, it will be seen that the present process has the general advantages, as compared with the sulphamate process, of being more rapid and requiring less critical control of the deposition conditions.

When depositing films over 7500 A. thick, it is found desirable to carry out the deposition in stages, depositing not more than 7500 A. in each stage. Thus 15,000 A. films have been deposited in two stages, each of 7500 A. Between stages the cathode is left immersed in the electrolyte or in water for 3–5 minutes to allow hydrogen captured in the film to escape. If this precaution is not taken, the magnetic properties later deteriorate noticeably as the hydrogen is gradually released. This precaution is not necessary for films of less than 7500 A.

The present process has also been used to deposit extremely thin nickel-iron films on a nickel/copper rod. 60/40 nickel/copper alloy (constantan) has a lattice parameter of 3.55 A. which closely matches that of 82/18 nickel/iron (3.531 A.), whereas the corresponding figures for copper, gold and platinum are 3.609, 4.07 and 3.91 A. Moreover, the crystal form of 60/40 nickel/copper is face-centred cubic, as is 82/18 nickel/iron. This similarity of crystal structure has enabled films only 500 A. thick with measurable magnetic properties to be produced, which is not possible with copper or gold substrates, the lower limit for which is about 800 A. The reduced stress when using a nickel/copper substrate results in a reduced coercive force as compared with copper. Electrolytic polishing of the nickel/copper rod prior to deposition is carried out in an orthophosphoric/sulphuric acid bath.

In addition to depositing 82/18 nickel/iron, other nickel/iron alloys in the Permalloy range such as 70/30 and 65/35 have been deposited by making the nickel/iron ratio in the electrolyte equal to the desired alloy ratio. Above 15,000 A. these iron-rich films are brittle, the brittleness increasing with the percentage of iron; pure iron is very brittle. However satisfactory films of 70/30, 65/35 and pure iron have been made below 10,000 A.

It has also been found possible to deposit alloy films incorporating cobalt by preparing a cobalt citrate complex solution from cobalt carbonate

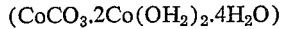
$$(CoCO_3 \cdot 2Co(OH_2)_2 \cdot 4H_2O)$$

and mixing this solution with the nickel and/or iron citrate complex solutions in proportions to give the same cobalt ratio in the solution as is required in the alloy. In this way thin films of 50Ni/50Co and 80Ni/10Co/10Fe have been deposited, having the relatively high coercive forces characteristic of their compositions.

I claim:
1. The method of electrodepositing magnetic alloy films containing nickel as a constituent on metal stock comprising, placing the metal stock in an aqueous electrolyte solution consisting of the reaction product of the metal to be deposited, a salt of citric acid and citric acid, the only anions present in said solution being citrate anions, subjecting the metal stock to electrolysis in the presence of a magnetic field to effect the deposition of the magnetic alloy film thereon, and withdrawing the coated metal stock from the electrolyte.

2. The method of electrodepositing nickel/iron metal alloy films on metal stock comprising placing the metal stock in an aqueous electrolyte solution consisting of the reaction product of nickel carbonate, iron powder, ammonium citrate, and citric acid, the pH of said electrolyte solution being between 9 and 10, subjecting the metal stock to electrolysis in the presence of a magnetic field wherein the cathode current density is adjusted to give a deposition potential in the range 1400–1450 mv., and withdrawing the coated metal stock from the electrolyte.

3. The method of electrodepositing nickel/iron metal alloy films over 7500 A. thick on metal stock comprising, placing the metal stock in an aqueous electrolyte solution consisting of the reaction product of nickel carbonate, iron powder, ammonium citrate, and citric acid, the pH of said electrolyte solution being between 9 and 10, subjecting the metal stock to electrolysis in the presence of a magnetic field to effect a film deposition not more than 7500 A. thick, permitting hydrogen trapped in the film to escape, and repeating the electrolysis at least one more time to effect a further film deposition of not more than 7500 A. thick for each electrolysis operation.

4. The method of electrodepositing nickel/iron alloy films on nickel/copper alloy stock comprising placing said stock in an aqueous electrolyte solution consisting of the reaction product of nickel carbonate, iron powder, ammonium citrate and citric acid, the only anions present in said solution being citrate anions, subjecting said stock to electrolysis to effect the depositing of the nickel/iron alloy film thereon, and withdrawing the coated stock from the electrolyte.

References Cited by the Examiner
UNITED STATES PATENTS

| | | | |
|---|---|---|---|
| 1,508,448 | 9/1924 | Glaeser | 260—439 |
| 2,832,729 | 4/1958 | Safranek | 204—43 |
| 2,945,217 | 7/1960 | Fisher et al. | 204—43 |
| 3,032,485 | 5/1962 | Tsu et al. | 204—43 |
| 3,032,486 | 5/1962 | Sallo et al. | 204—43 |

JOHN H. MACK, *Primary Examiner.*

JOHN R. SPECK, *Examiner.*